(No Model.)

H. TABOR.
SHAFT COUPLING.

No. 322,866. Patented July 21, 1885.

WITNESSES:
R. W. Whittlesey
C. M. Clarke

INVENTOR
Harris Tabor
BY J. Snowden Bell
ATTORNEY.

UNITED STATES PATENT OFFICE.

HARRIS TABOR, OF NEW YORK, N. Y.

SHAFT-COUPLING.

SPECIFICATION forming part of Letters Patent No. 322,866, dated July 21, 1885.

Application filed June 18, 1885. (No model.)

*To all whom it may concern:*

Be it known that I, HARRIS TABOR, of the city, county, and State of New York, have invented certain new and useful Improvements in Shaft-Couplings, of which improvements the following is a specification.

The object of my invention is to provide a shaft-coupling of simple and inexpensive construction, in the use of which flexure in any direction and variation from absolute axial alignment of the connected shaft-sections may be permitted without liability to breakage or undue strain, and an elastic application of driving-power be afforded.

To these ends my invention, generally stated, consists in the combination, with two lines or sections of shafting, of a strip or band of flexible material, connected at different points in its length to arms or disks on one and the other of said lines alternately. The improvements claimed are hereinafter fully set forth.

Figure 1:
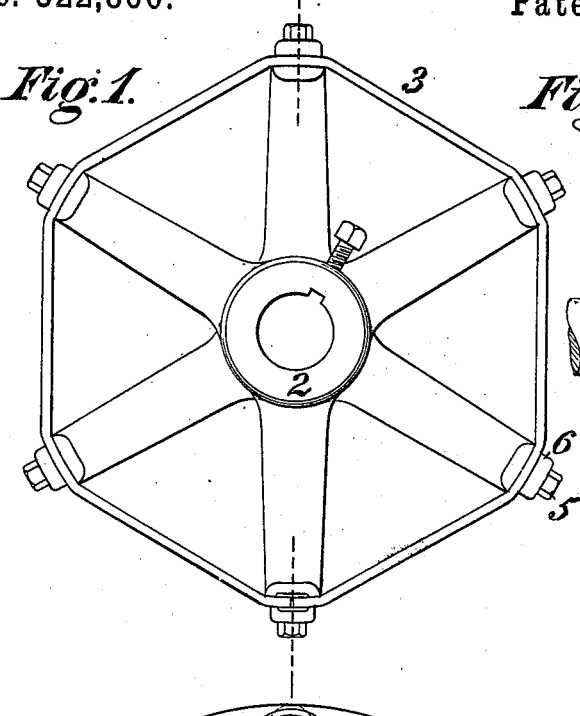
Figure 2:
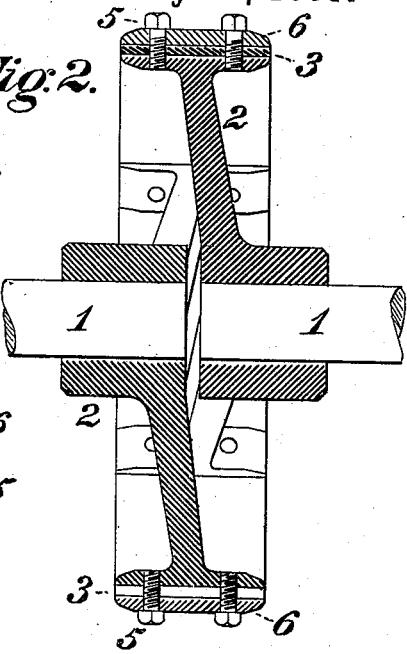
Figure 3:
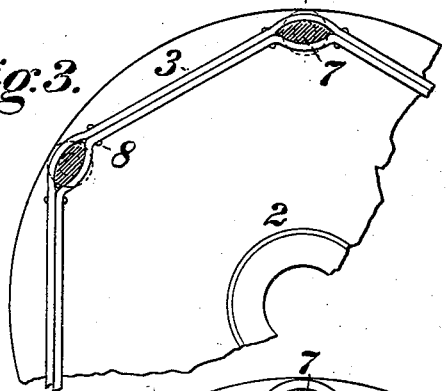
Figure 4:
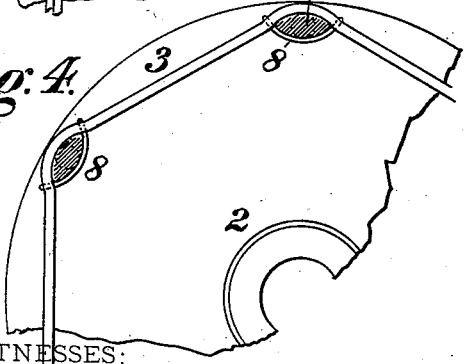

In the accompanying drawings, Figure 1 is an end view, in elevation, of a shaft-coupling embodying my invention; Fig. 2, a longitudinal section through the same; Figs. 3 and 4 end views in elevation, illustrating modifications; and Figs. 5 and 6 longitudinal central sections through the couplings shown in Figs. 3 and 4, respectively.

In the practice of my invention I effect the connection of two lines or sections of shafting, 1 1, by means of a strip or band, 3, of leather, rubber, sheet metal, wire rope, or other material of a flexible and slightly elastic nature, the band 3, which surrounds the shaft-sections at some distance therefrom and extends in polygonal form in a plane perpendicular to their axes, being secured, alternately, at points separated by intervening spaces of sufficient length to permit the flexibility of the band to be exerted to one and the other section, respectively. The connection of the band 3 and shaft-sections 1 1 is effected through coupling heads or bearers 2, secured by keys or set-screws upon the shaft-sections 1 1 adjacent to their meeting ends. Each of said heads consists of a substantial hub or boss fitting the shaft-section, and a series of arms, as in Figs. 1 and 2, or a continuous plate or disk, as in Figs. 3 to 6, projecting therefrom. The band 3 may be secured to the coupling-heads in any suitable and convenient manner, it being only requisite that it shall be connected alternately to one and to the other, and that the spaces between the connections shall be long enough to admit of relative movement of the coupling-heads and shaft-sections within the range of the flexibility and elasticity of the band.

As illustrated in Figs. 1 and 2, bearing-faces of a length about equal to the width of the band 3 are formed upon the outer ends of the arms of the coupling-heads, and the band is connected thereto by bolts or studs 5, passing through caps 6, and through the band 3 into the bearing-faces.

Figure 5:
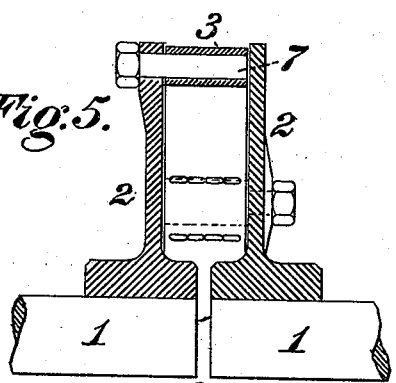
Figure 6:
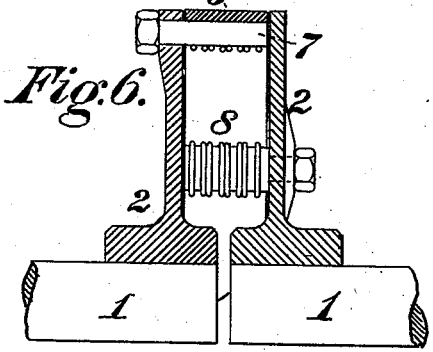

In the coupling shown in Figs. 3 and 5 the band 3 is formed of two thicknesses of material, which pass on opposite sides of and are secured by lacings 8 to bolts 7, having flattened or spheroidal-formed bodies in order to afford better bearing-surfaces for the bands, said bolts being secured alternately in the projecting plates or disks of the coupling-heads 2 of the two shaft-sections. The construction of Figs. 4 and 6 differs in the particular that the band 3 is in one thickness only, it being similarly connected by lacings 8 to the alternate bolts 7 of the two coupling-heads.

It will be seen that rotation will be imparted by the band 3 from the driving to the driven section of the shafting, whether said sections be in or out of axial coincidence, the coupling acting in the manner of a universal joint to permit a limited range of angularity in the shaft-sections without detrimental result, as well as to admit of normal rotation under circumstances which may cause one section to drop below the axial line of the other. It will be further obvious that the elasticity of the band will be advantageously exerted in the application of power to the driven section.

I claim as my invention and desire to secure by Letters Patent—

1. The combination of two lines or sections of shafting, and a flexible strip or band secured by intermediate connections at different points in its length to one and the other of said lines alternately, substantially as set forth.

2. The combination of two coupling heads or bearers, each secured to a line or section of shafting, and a flexible strip or band secured peripherally to one and the other of said coupling-heads alternately, at points separated by spaces over which the flexible band passes freely, substantially as set forth.

3. The combination of two coupling heads or bearers, each secured upon a line or section of shafting, and having a series of outer bearing-faces, said bearing-faces being fixed alternately to one and to the other coupling-head, and a flexible strip or band passing over said bearing-faces and secured thereto, substantially as set forth.

HARRIS TABOR.

Witnesses:
E. J. BUNKER,
CHAS. EDGAR MILLS.